United States Patent
Croak et al.

(10) Patent No.: US 7,756,254 B1
(45) Date of Patent: Jul. 13, 2010

(54) METHOD AND APPARATUS FOR RE-ORIGINATING EMERGENCY CALLS ON FAILURE CONDITIONS

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

(*) Notice: Subject to any disclaimer, the term of this patent is extended or adjusted under 35 U.S.C. 154(b) by 538 days.

(21) Appl. No.: 11/322,454

(22) Filed: Dec. 31, 2005

(51) Int. Cl.
*H04M 11/04* (2006.01)

(52) U.S. Cl. .................. 379/46; 370/352; 370/353; 370/354; 370/355; 370/356; 379/37; 379/39; 379/40; 379/42; 379/45; 379/50; 379/221.03; 379/221.04; 455/404.1; 455/414.1; 455/445; 709/227; 709/228; 709/229; 709/239

(58) Field of Classification Search .............. 379/93.25, 379/93.03, 37, 39, 40, 42, 45, 46, 50, 221.03, 379/221.04; 370/351–356; 455/404.1, 414.1, 455/445; 709/227–229, 239
See application file for complete search history.

(56) References Cited

U.S. PATENT DOCUMENTS

| | | | | |
|---|---|---|---|---|
| 5,249,223 A | * | 9/1993 | Vanacore | 379/266.06 |
| 5,379,337 A | * | 1/1995 | Castillo et al. | 379/45 |
| 5,661,779 A | * | 8/1997 | Lee | 379/45 |
| 5,937,355 A | * | 8/1999 | Joong et al. | 455/466 |
| 6,275,481 B1 | * | 8/2001 | Penttinen | 370/329 |
| 6,327,342 B1 | * | 12/2001 | Mobley et al. | 379/45 |
| 6,330,323 B1 | * | 12/2001 | Gottlieb et al. | 379/220.01 |
| 6,359,979 B1 | * | 3/2002 | Wang et al. | 379/221.01 |
| 7,027,564 B2 | * | 4/2006 | James | 379/37 |
| 7,031,714 B1 | * | 4/2006 | Rayburn | 455/445 |
| 2001/0021646 A1 | * | 9/2001 | Antonucci et al. | 455/404 |
| 2004/0102178 A1 | * | 5/2004 | Williams | 455/404.1 |
| 2006/0193447 A1 | * | 8/2006 | Schwartz | 379/45 |

* cited by examiner

*Primary Examiner*—Hemant Patel

(57) ABSTRACT

A method and apparatus for enabling a signaling message to be sent in response to an emergency call, e.g., an E911 call, set up message to provide information as to whether or not the E911 call has been successfully completed are disclosed. An indicator of a failed call setup will trigger the call to be re-originated transparently to an emergency center where live operators can handle the call on a 24hours/day basis. In one embodiment, an emergency center is a call center that is operated by a network provider or a third party provider to support emergency calls when a PSAP cannot be reached by a caller for various reasons. The emergency center is capable forwarding a call to the appropriate PSAP for call termination on behalf of the E911 caller.

15 Claims, 4 Drawing Sheets

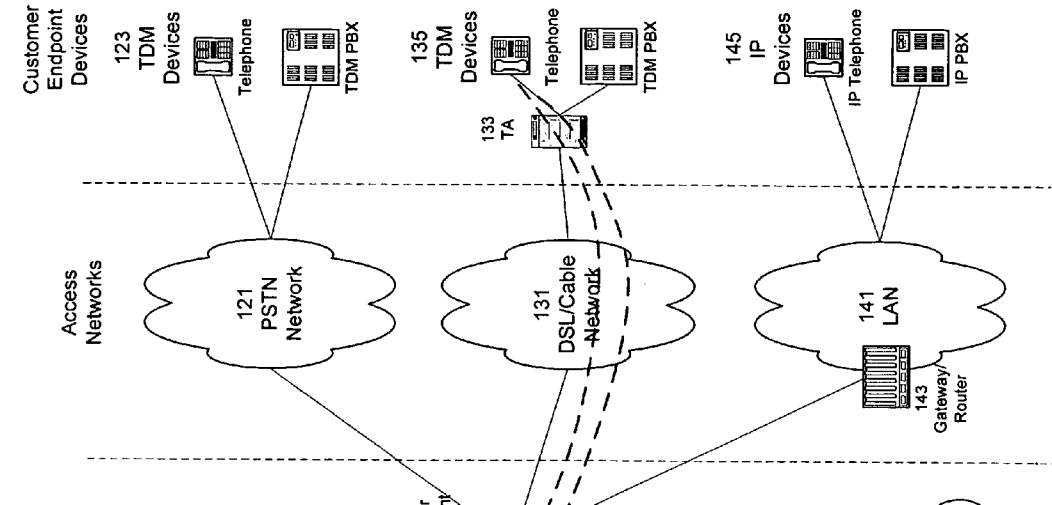
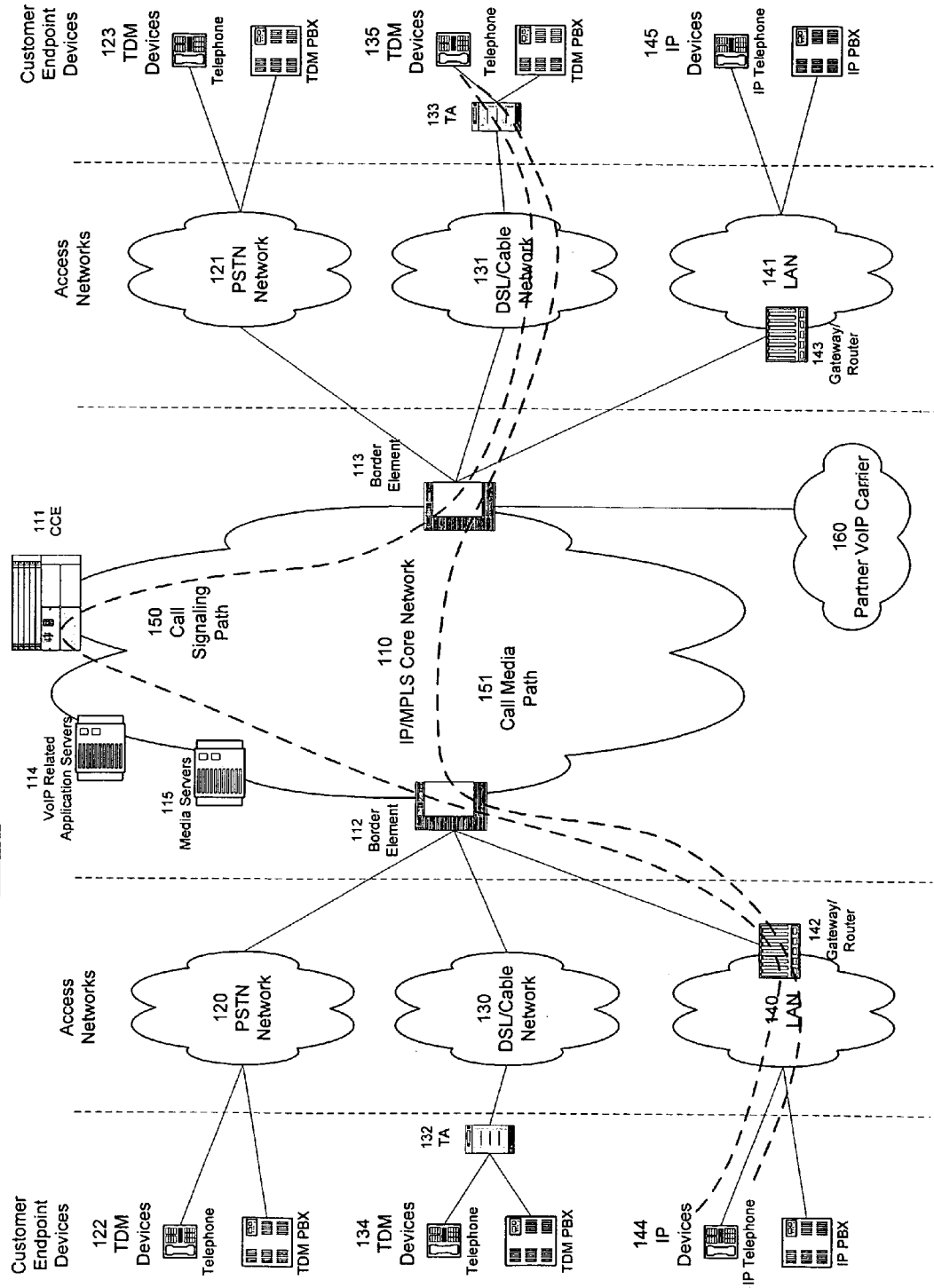
FIG. 1

400

METHOD AND APPARATUS FOR RE-ORIGINATING EMERGENCY CALLS ON FAILURE CONDITIONS

The present invention relates generally to communication networks and, more particularly, to a method and apparatus for re-originating emergency calls, e.g. Enhance 911 calls, on failure conditions in communication networks, e.g. packet networks such as Voice over Internet Protocol (VoIP) networks.

BACKGROUND OF THE INVENTION

VoIP network providers are required to provide Enhanced 911 (E911) services to their subscribers for requesting emergency assistance purposes. Failure to complete call setup of these emergency calls due to a network condition can have serious or even fatal consequences. It is imperative that an E911 be answered by an emergency operator even during a network event that may prevent the E911 call to be completed to a Public Safety Answering Point (PSAP Therefore, a need exists for a method and apparatus for re-originating emergency calls, e.g. Enhanced 911 calls, on failure conditions in a packet network, e.g., a VoIP network.

SUMMARY OF THE INVENTION

In one embodiment, the present invention enables a signaling message to be sent in response to an emergency call, e.g., an E911 call, set up message to provide information as to whether or not the E911 call has been successfully completed. An indicator of a failed call setup will trigger the call to be re-originated transparently to an emergency center where live operators can handle the call. For example, an emergency center is a call center that is operated by a network provider or a third party provider to support emergency calls when a PSAP cannot be reached by a caller for various reasons. The emergency center is capable forwarding a call to the appropriate PSAP for call termination on behalf of the E911 caller.

BRIEF DESCRIPTION OF THE DRAWINGS

The teaching of the present invention can be readily understood by considering the following detailed description in conjunction with the accompanying drawings, in which:

FIG. 1 illustrates an exemplary Voice over Internet Protocol (VoIP) network related to the present invention;

To facilitate understanding, identical reference numerals have been used, where possible, to designate identical elements that are common to the figures.

DETAILED DESCRIPTION

Figure 2:
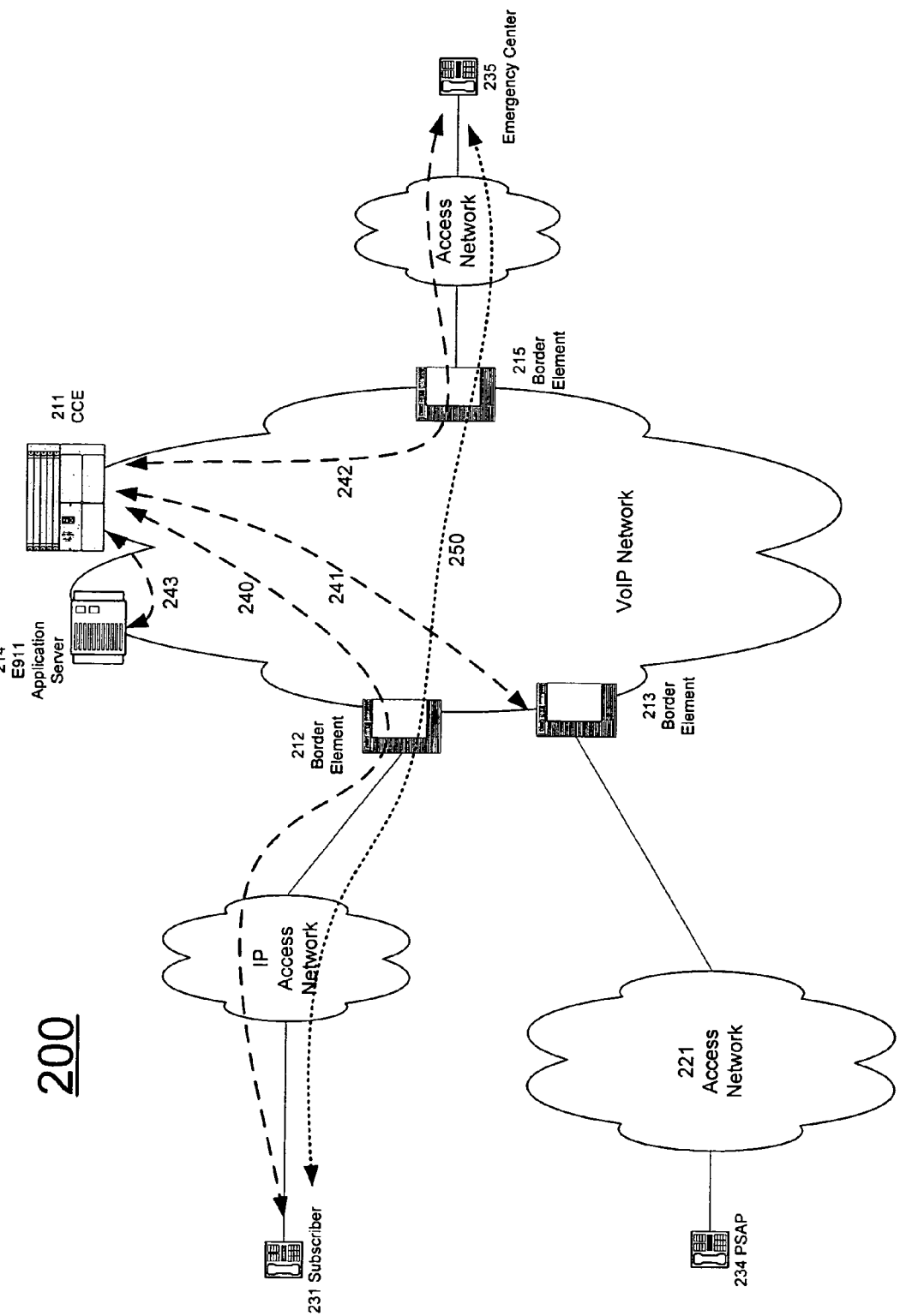
FIG. 2 illustrates an example of re-originating emergency calls, e.g. Enhanced 911 calls, on failure conditions in a packet network, e.g., a VoIP network of the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

VoIP network providers are required to provide Enhanced 911 (E911) services to their subscribers for requesting emergency assistance purposes. Failure to complete call setup of these emergency calls due to a network condition can have serious or even fatal consequences. It is imperative that an E911 be answered by an emergency operator even during a network event that may prevent the E911 call to be completed to a Public Safety Answering Point (PSAP). E911 is an emergency response service that allows emergency personnel at a Public Safety Answering Point (PSAP) to respond to the emergency call and receive the location of a caller placing the emergency call and the calling party phone number. A PSAP is an emergency response center that is responsible for answering E911 calls for emergency assistance from police, fire and ambulance services.

To address this need, the present invention enables a signaling message to be sent in response to an emergency call, e.g., an E911 call, set up message to provide information as to whether or not the E911 call has been successfully completed. An indicator of a failed call setup will trigger the call to be re-originated transparently to an emergency center where live operators can handle the call on a 24 by 7 basis. In one embodiment, an emergency center is a call center that is operated by a network provider or a third party provider to support emergency calls when a PSAP cannot be reached by a caller for various reasons. The emergency center is capable forwarding a call to the appropriate PSAP for call termination on behalf of the E911 caller.

FIG. 2 illustrates an example 200 of re-originating emergency calls, e.g. Enhanced 911 calls, on failure conditions in a packet network, e.g., a VoIP network of the present invention. In FIG. 2, subscriber 231 sends an E911 call setup message to CCE 211 via BE 212 using flow 240. Upon receiving the E911 call setup message, CCE 211 finds out that the call is an E911 call and identifies the appropriate PSAP, e.g., PSAP 234, in which the call is to be terminated. CCE 211 sends the E911 call setup message to BE 213 using flow 241 for call establishment. CCE 211 identifies PSAP 234 by communicating with E911 AS 214 using flow 243. In one embodiment, E911 AS 214 performs a lookup of the subscriber's service address using the subscriber's phone number and then uses the obtained service address to identify PSAP 234 to handle the E911 call for the service address. BE 213 attempts to complete the call via access network 221 but fails. BE 213 immediately sends an E911 call failure signaling message to CCE 211 using flow 241. Upon receiving the E911 call failure signaling message, CCE 211 then attempts to re-originate the E911 call to an emergency center via BE 215 to reach Emergency Center 235 using flow 242. In one embodiment, an emergency center is a call center that is operated 24 hours/day by a network provider or a third party provider to support emergency calls when a PSAP cannot be reached by a caller for various reasons. The emergency center is capable forwarding a call to the appropriate PSAP for call termination on behalf of the E911 caller. Once the call is successfully established, subscriber 231 and Emergency Center 235 communicate with each other using media flow 250.

Figure 3:
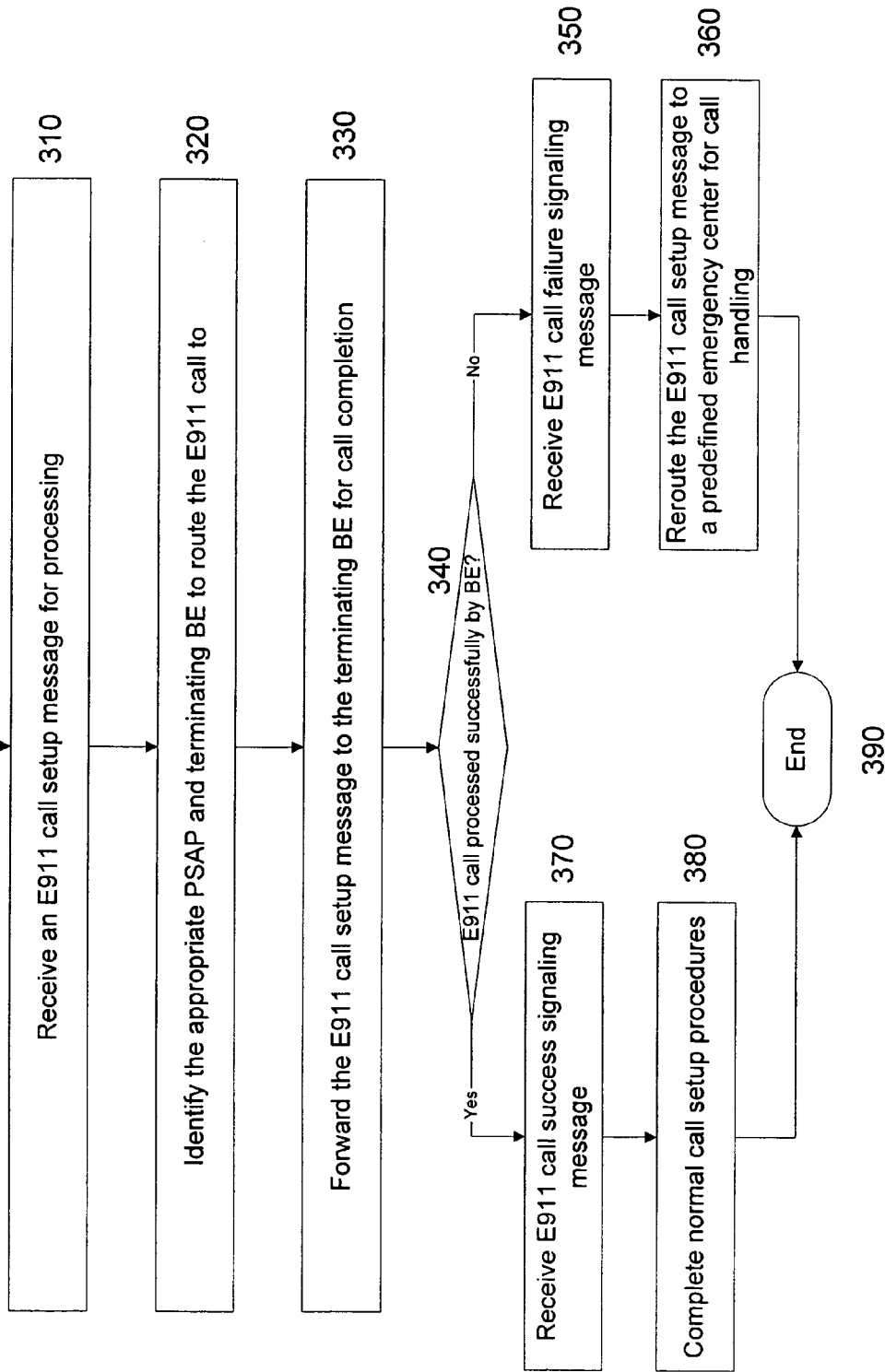
FIG. 3 illustrates a flowchart of a method for re-originating emergency calls, e.g. Enhanced 911 calls, on failure conditions in a packet network, e.g., a VoIP network, of the present invention.

FIG. 3 illustrates a flowchart of a method 300 for re-originating emergency calls, e.g. Enhanced 911 calls, on failure conditions in a packet network, e.g., a VoIP network, of the present invention. Method 300 starts in step 305 and proceeds to step 310.

In step 310, the method receives an E911 call setup message. The E911 call setup message is received by a CCE.

In step 320, the method identifies the appropriate PSAP and the terminating BE for call completion. The PSAP and the terminating BE are identified by the CCE. Specifically, the appropriate PSAP is identified by the CCE by communicating with an E911 AS. In one embodiment, the E911 AS performs a lookup of the subscriber's service address using the subscriber's phone number and then uses the obtained service address to identify the appropriate PSAP to handle the E911 call for the service address.

In step 330, the method forwards the E911 call setup message to the identified terminating BE to complete the call to the identified PSAP. The E911 call setup message is forwarded by the CCE.

In step 340, the method checks if the E911 call has been successfully processed. The E911 call processing is checked by the terminating BE and a signaling message that indicates a failure or a success to complete the E911 call is sent by the terminating BE to the CCE. If the E911 call has been successfully processed, the method proceeds to step 370; otherwise, the method proceeds to step 350.

In step 350, the method receives an E911 call failure signaling message. The E911 call failure signaling message is sent by the terminating BE and received by the CCE.

In step 360, the method re-originates the E911 call setup message to an emergency center for call completion. In one embodiment, an emergency center is a call center that is operated by a network provider or a third party provider to support emergency calls when a PSAP cannot be reached by a caller for various reasons. The emergency center is capable forwarding a call to the appropriate PSAP for call termination on behalf of the E911 caller. The E911 call setup message is re-originated by the CCE.

In step 370, the method receives an E911 call success signaling message. The E911 call success signaling message is sent by the terminating BE and received by the CCE.

In step 380, the method completes the normal call processing procedures for the E911 call to the identified PSAP. The normal call processing of the E911 call setup message is completed by the CCE. The method ends in step 390.

Figure 4:
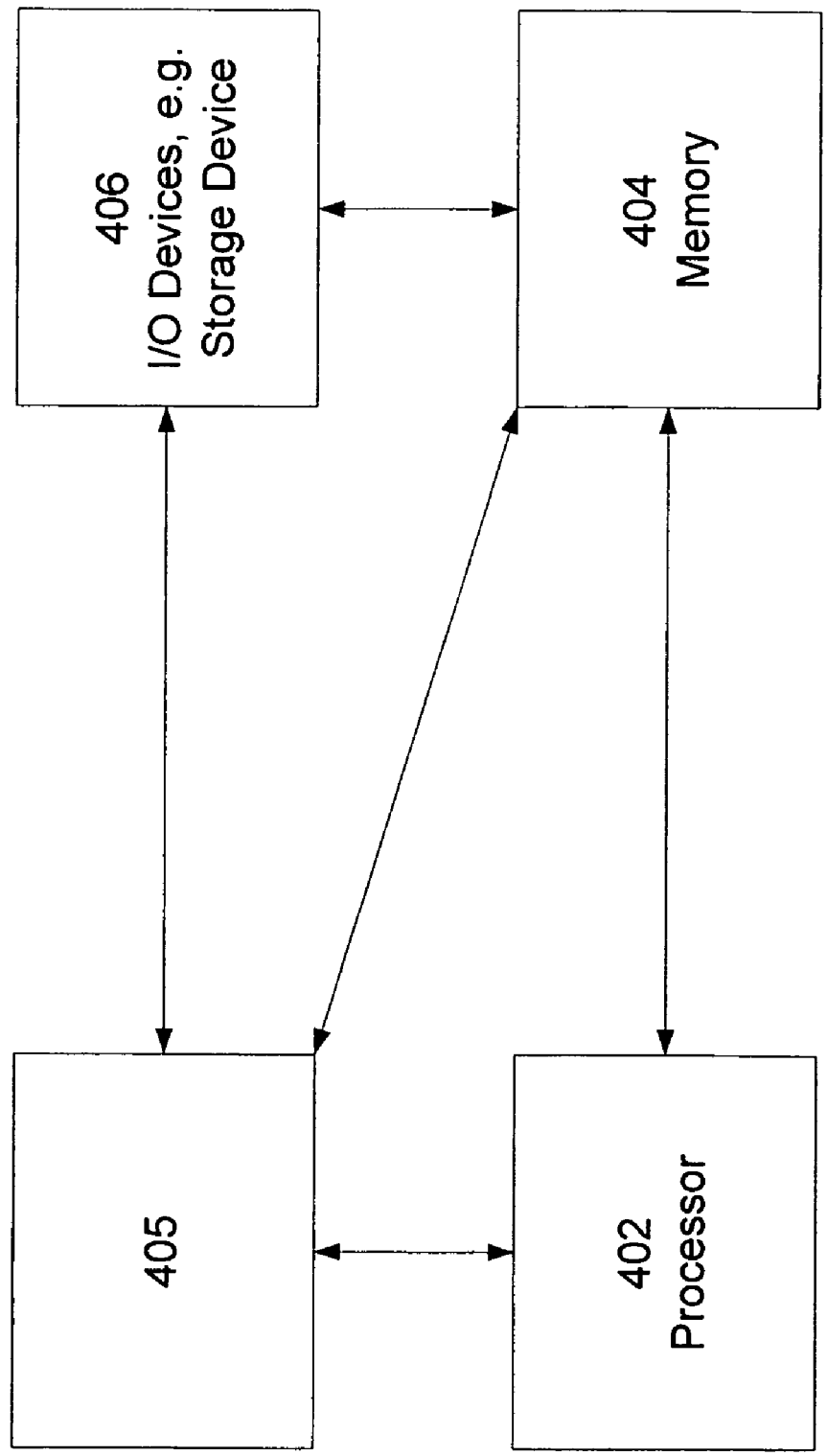
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for re-originating emergency calls on failure conditions, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for re-originating emergency calls on failure conditions can be loaded into memory 404 and executed by processor 402 to implement the functions as discussed above. As such, the present process 405 for re-originating emergency calls on failure conditions (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for re-originating an emergency call in a communication network, comprising:

receiving a call setup message associated with an emergency call;

re-originating said emergency call to an emergency center, wherein said emergency center is operated by a network provider of said communication network or a third party emergency answering service provider, if said emergency call failed to be completed to a Public Safety Answering Point (PSAP) by said communication network, wherein said re-originating comprises:

receiving a signaling message indicating that said emergency call to said PSAP has not been completed successfully; and rerouting said call setup message to said emergency center for call completion; and forwarding said call setup message to said PSAP via said emergency center to complete said emergency call in response to said receiving said signaling message indicating that said emergency call to said PSAP has not been completed successfully.

2. The method of claim 1, wherein said communication network is a Voice over Internet Protocol (VoIP) network or a Service over Internet Protocol (SoIP) network.

3. The method of claim 1, wherein said emergency call is an Enhanced 911 (E911) call.

4. The method of claim 1, wherein said call setup message to said emergency center is rerouted by a Call Control Element (CCE).

5. The method of claim 1, wherein said PSAP is identified by a Call Control Element (CCE) by communicating with an Enhanced 911 (E911) Application Server (AS).

6. The method of claim 1, wherein said emergency center provides a live operator to answer emergency calls on a 24 hours a day basis.

7. A computer-readable medium having stored thereon a plurality of instructions, the plurality of instructions including instructions which, when executed by a processor, cause the processor to perform steps of a method for re-originating an emergency call in a communication network, comprising:

receiving a call setup message associated with an emergency call;

re-originating said emergency call to an emergency center, wherein said emergency center is operated by a network provider of said communication network or a third party emergency answering service provider, if said emergency call failed to be completed to a Public Safety Answering Point (PSAP) by said communication network, wherein said re-originating comprises:

receiving a signaling message indicating that said emergency call to said PSAP has not been completed successfully; and rerouting said call setup message to said emergency center for call completion; and forwarding said call setup message to said PSAP via said emergency center to complete said emergency call in response to said receiving said signaling message indicating that said emergency call to said PSAP has not been completed successfully.

8. The computer-readable medium of claim 7, wherein said communication network is a Voice over Internet Protocol (VoIP) network or a Service over Internet Protocol (SoIP) network.

9. The computer-readable medium of claim 7, wherein said emergency call is an Enhanced 911 (E911) call.

10. The computer-readable medium of claim 7, wherein said call setup message to said emergency center is rerouted by a Call Control Element (CCE).

11. The computer-readable medium of claim 7, wherein said PSAP is identified by a Call Control Element (CCE) by communicating with an Enhanced 911 (E911) Application Server (AS).

12. The computer-readable medium of claim 7, wherein said emergency center provides a live operator to answer emergency calls on a 24 hours a day basis.

13. An apparatus for re-originating an emergency call in a communication network, comprising:

means for receiving a call setup message associated with an emergency call;

means for re-originating said emergency call to an emergency center, wherein said emergency center is operated by a network provider of said communication network or a third party emergency answering service provider, if said emergency call failed to be completed to a Public Safety Answering Point (PSAP) by said communication network, wherein said re-originating means comprises:

means for receiving a signaling message indicating that said emergency call to said PSAP has not been completed successfully; and means for rerouting said call setup message to said emergency center for call completion; and means for forwarding said call setup message to said PSAP via said emergency center to complete said emergency call in response to said receiving said signaling message indicating that said emergency call to said PSAP has not been completed successfully.

14. The apparatus of claim 13, wherein said communication network is a Voice over Internet Protocol (VoIP) network or a Service over Internet Protocol (SoIP) network.

15. The apparatus of claim 13, wherein said emergency call is an Enhanced 911 (E911) call.

\* \* \* \* \*